US012757250B2

(12) United States Patent
Hurd et al.

(10) Patent No.: US 12,757,250 B2
(45) Date of Patent: Oct. 6, 2026

(54) PHYSICAL RANDOM ACCESS CHANNEL (PRACH) RECEIVER FOR DETERMINING CELLS IN WHICH A PREAMBLE HAS BEEN TRANSMITTED

(71) Applicant: Telefonaktiebolaget LM Ericsson (publ), Stockholm (SE)

(72) Inventors: Magnus Hurd, Stockholm (SE); Oskar Mauritz, Johanneshov (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 326 days.

(21) Appl. No.: 18/281,455

(22) PCT Filed: Mar. 12, 2021

(86) PCT No.: PCT/SE2021/050221
§ 371 (c)(1),
(2) Date: Sep. 11, 2023

(87) PCT Pub. No.: WO2022/191749
PCT Pub. Date: Sep. 15, 2022

(65) Prior Publication Data
US 2024/0163923 A1 May 16, 2024

(51) Int. Cl.
*H04W 74/00* (2009.01)
*H04W 74/08* (2009.01)
(Continued)

(52) U.S. Cl.
CPC ..... *H04W 74/0816* (2013.01); *H04W 74/002* (2013.01); *H04W 74/0866* (2013.01); *H04W 74/0833* (2013.01)

(58) Field of Classification Search
None
See application file for complete search history.

(56) References Cited

U.S. PATENT DOCUMENTS 10,932,296 B2 2/2021 Wu et al.
2008/0043858 A1 2/2008 Lim et al.
(Continued)

FOREIGN PATENT DOCUMENTS

CN 109842945 A 6/2019
EP 1953982 A1 * 8/2008 ......... H04L 27/2675
(Continued)

OTHER PUBLICATIONS

International Search Report and Written Opinion issued in International Application No. PCT/SE2021/050221 Dec. 22, 2021 (11 pages).
(Continued)

*Primary Examiner* — Gerald A Smarth
(74) *Attorney, Agent, or Firm* — Rothwell, Figg, Ernst & Manbeck, P.C.

(57) ABSTRACT

A method (300) for determining cells in which a preamble has been transmitted. The method includes obtaining (s302) N sample sets, wherein each one of the N sample sets comprises a set of M samples and each one of the N sample sets is associated with a different cell included in a set of N cells. The method also includes adding (s304) the N sample sets to create a first combined set of samples comprising M samples. The method also includes forming (s306) a first candidate set of one or more tuples based on the first combined set of samples and an initial set of tuples comprising a plurality of tuples, wherein each tuple comprises a candidate preamble and a candidate delay, and wherein each candidate preamble comprises a set of samples. The method further includes using (s308) the first candidate set of one or more tuples to determine, for each cell included in the set of cells, whether a preamble included in the first candidate set of tuples was transmitted in the cell.

20 Claims, 4 Drawing Sheets

(51) Int. Cl.
*H04W 74/0816* (2024.01)
*H04W 74/0833* (2024.01)

(56) References Cited

U.S. PATENT DOCUMENTS

| | | | |
|---|---|---|---|
| 2018/0124830 | A1 | 5/2018 | Lin et al. |
| 2020/0120712 | A1 | 4/2020 | Ren et al. |

FOREIGN PATENT DOCUMENTS

| | | | | | |
|---|---|---|---|---|---|
| EP | 3 119 049 | A1 | | 1/2017 | |
| EP | 3425990 | A1 | * | 1/2019 | ........ H04W 74/0633 |
| TW | 1639334 | B | * | 10/2018 | ............. H04N 19/11 |
| WO | 2007/149133 | A2 | | 12/2007 | |
| WO | 2021/026931 | A1 | | 2/2021 | |

OTHER PUBLICATIONS

Sesia, S., et al., “LTE—The UMTS Long Term Evolution: From Theory to Practice,” chapter 17, section 17.5.2, John Wiley and Sons Ltd, Jul. 2011 (14 pages).

* cited by examiner

PHYSICAL RANDOM ACCESS CHANNEL (PRACH) RECEIVER FOR DETERMINING CELLS IN WHICH A PREAMBLE HAS BEEN TRANSMITTED

CROSS REFERENCE TO RELATED APPLICATIONS

This application is a 35 U.S.C. § 371 National Stage of International Patent Application No. PCT/SE2021/050221, filed 2021 Mar. 12.

TECHNICAL FIELD

This disclosure relates to methods, devices, computer programs and carriers related to determining cells in which a preamble has been transmitted.

BACKGROUND

The Physical Random Access Channel (PRACH) is the channel used by a user equipment (UE) to establish a connection with a access network node (e.g., base station). When a UE attempts to establish a connection with an access network node, the UE transmits a PRACH preamble.

In some scenarios carriers of a wireless technology are only defined up to a certain maximum of bandwidth. Aggregating many such carriers provides a straightforward path to very high bandwidths (very high bitrates). That kind of technology is in the 3rd Generation Partnership Project (3GPP) referred to as carrier aggregation (CA). The development in 3GPP is towards increasingly higher number of carriers to be aggregated: 3GPP Long Term Evolution (LTE) release 13 (Rel-13) increased the number of component carriers to 32; 3GPP New Radio (NR) release 15 can aggregate up to 16 component carriers.

Each of these carriers corresponds to a cell. When exposed to a multitude of carriers a carrier-aggregation enabled UE would connect to one of the corresponding cells based on measurements with regard to a Synchronization Signal Block (SSB). Each cell typically broadcasts at least one such SSB. The cell selected offers PRACH preamble resources to the UE indirectly pointed out by the SSB.

The cell selected is referred to as the primary cell (PCell) or, if this procedure happened on the second leg in a Dual Connectivity (DC) setup, as the Primary SCG Cell (PSCell). A common term valid for both DC and non-DC is Special Cell (SpCell): for DC it would be PCell or PSCell; for non-DC it would be PCell. It is the SpCell that offers preamble resources to the UE.

A cell is configured with a mapping from SSBs to PRACH occasions and to sets of preamble indices as explained in 3GPP Technical Specification (TS) 38.213. A cell may have more than one SSB: for mm-wave deployment it is common to have different SSBs transmitted in different beams (in different directions) for the sake of coverage. The configuration is conveyed to the UEs, e.g. via broadcast (see 3GPP TS 38.331). One or more SSB indices may be mapped to the same PRACH occasion but then to different preamble indices, a mapping procedure prescribed by 3GPP (see 3GPP TS 38.213). One PRACH occasion can be viewed as containing no more than 64 preamble indices, so it is this set of preamble indices that need to be distributed among the different SSBs (e.g. if there is only one SSB associated to the PRACH occasion then it could be mapped to all 64 preamble indices).

PRACH preambles in NR are generated from Zadoff-Chu sequences, as described in 3GPP TS 38.211. A preamble consists of one or more periods of the Zadoff-Chu sequence plus a cyclic prefix. The key point is that a sequence is unique (for each preamble index). Based on how the received sequence is shifted in time it is also possible to estimate the propagation delay.

A typical PRACH detector is described in chapter 17.5.2 of "LTE—The UMTS Long Term Evolution," (editors S. Sesia et. al, published by John Wiley and Sons Ltd., 2011). A bandpass filter is followed by a bank of correlators for the configured preamble sequences in the cell. The correlator output for different periods, if more than one period, of the periodic preamble may be combined either coherently or non-coherently. In the former case the complex correlator output from the different periods are summed, in the latter case the energy, i.e., the amplitude squared, of the correlator output is summed. Furthermore, the correlator outputs from different receive polarizations are added non-coherently.

Once a combined signal is formed from the correlator outputs, a preamble is detected if the energy scaled by the estimated noise energy for any sample within the possible range of delays in the combined signal exceeds a threshold. The sample with the highest energy also gives the estimated delay.

A straightforward solution to obtain high sensitivity for PRACH is to process the incoming signals down-converted to baseband, applying a PRACH detector to each cell and register the highest received energy for a preamble. The PRACH detector would correlate the baseband signal with Zadoff-Chu sequences for all delays. The result from this would be the preamble index selected by the UE and the delay corresponding to the distance between the PRACH detector and the UE. This is fundamental information that will be used in upcoming communication with the UE.

SUMMARY

Certain challenges presently exist. For example, current preamble detector systems fail to exploit an opportunity of common preamble detection among different cells (e.g., different carriers in a carrier aggregation scenario).

Accordingly, in one aspect a method is provided for determining cells in which a preamble has been transmitted. The method includes obtaining N sample sets, wherein each one of the N sample sets comprises a set of M samples and each one of the N sample sets is associated with a different cell included in a set of N cells. The method also includes adding the N sample sets to create a first combined set of samples comprising M samples. The method also includes forming a first candidate set of one or more tuples based on the first combined set of samples and an initial set of tuples comprising a plurality of tuples, wherein each tuple comprises a candidate preamble and a candidate delay, and wherein each candidate preamble comprises a set of samples. The method further includes using the first candidate set of one or more tuples to determine, for each cell included in the set of cells, whether a preamble included in the first candidate set of tuples was transmitted in the cell.

In another aspect there is provided a computer program comprising instructions which when executed by processing circuitry of a preamble detector causes the preamble detector to perform the method. In another aspect there is provided a carrier containing the computer program, wherein the carrier is one of an electronic signal, an optical signal, a radio signal, and a computer readable storage medium.

In another aspect there is provided a preamble detector, where the preamble detector is adapted to perform the method of any embodiments disclosed herein. In some embodiments, the preamble detector includes processing circuitry; and a memory containing instructions executable by the processing circuitry, whereby the preamble detector is operative to perform the methods disclosed herein.

An advantage of the embodiments disclosed herein is that they exploit the opportunity of common preamble detection, thereby significantly reducing the amount of signal processing and thus increasing performance.

BRIEF DESCRIPTION OF THE DRAWINGS

The accompanying drawings, which are incorporated herein and form part of the specification, illustrate various embodiments.

DETAILED DESCRIPTION

Figure 1:
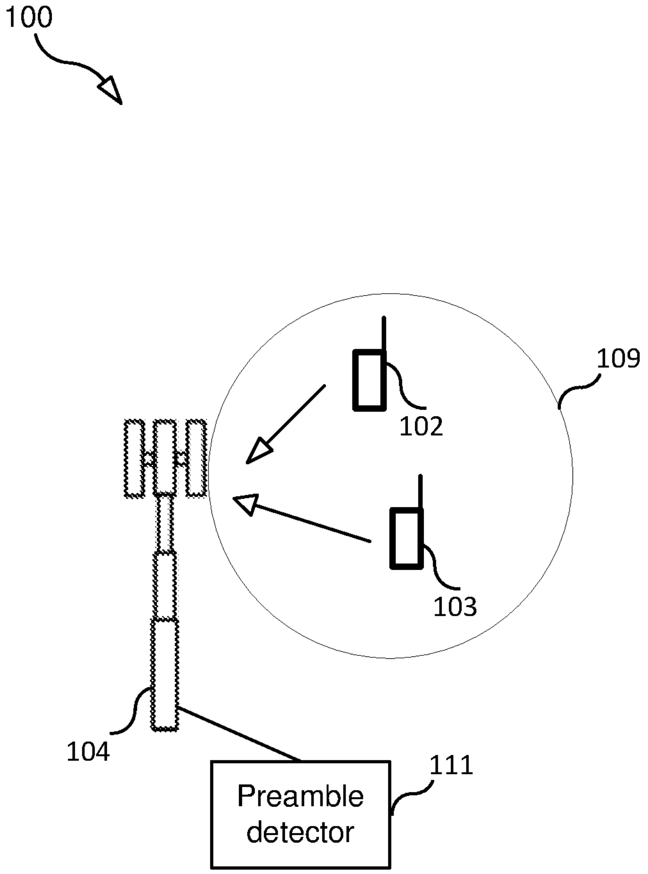
FIG. 1 illustrates a communications network according to an embodiment.

FIG. 1 illustrates a communications network 100 according to an embodiment. In the example embodiment shown, communications network 100 includes an access network node 104 (e.g., a base station, such as an NR base station (gNB), or a component of a base station) serving multiple cells 109 (e.g., a set of N cells Ci, i=0, 1, . . . , N) in which a first UE 102 and a second UE 103 are located. In this example, the cells 109 completely overlap with each other. While only a single access network node and two UEs are shown, this was done solely for the sake of brevity because communications network 100 can include virtually any number of access network nodes and UEs. As used herein a UE is any device capable of wireless communication with access network node 104.

In one embodiment, UEs 102 and 103 receive system information broadcast by access network node 104, which system information enables the UEs to select a random-access preamble (RAP) from a set of RAPs and use the selected RAP for a random access procedure. It is possible that both UEs will select different RAPs but transmit the RAP at the same time. A preamble detector 111 functions to detect the transmitted preambles. In some embodiments, preamble detector 111 is a component of access network node 104.

Figure 2:
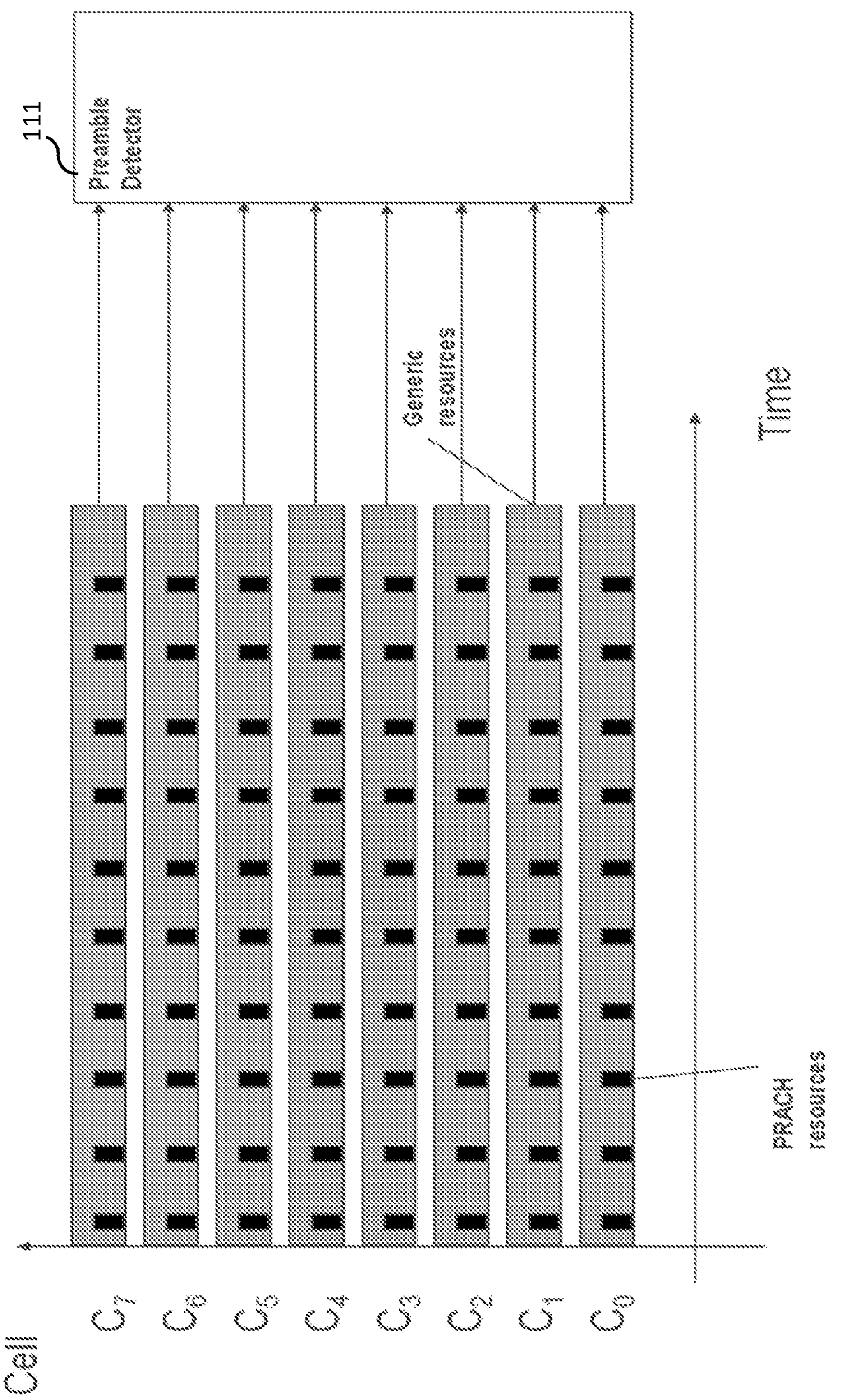
FIG. 2 is a flowchart illustrating a process according to an embodiment.

FIG. 2 illustrates an embodiment in which there are N=8 cells ($C_0$, $C_1$, . . . , $C_7$). In this embodiment, for each cell $C_i$, the baseband samples $S_{ik}$, where k is either a time or frequency index and k=1, . . . , M, related to the PRACH channel are stored in preamble detector 111 (a.k.a., "common PRACH detector"). In a prior-art preamble detection system detector these samples would be processed strictly on a cell basis, separately without any mixing of samples from different cells (e.g., different carriers). That is, in the prior art if there are N cells, then there are N preamble detectors, one for each cell.

The embodiment shown in FIG. 2 takes advantage of two facts: (i) preambles are physical signals that may be chosen to be identical from cell to cell; (ii) preambles are defined at baseband which means preambles from different cells can be considered appearing in the same frequency domain. Therefore, it is possible to add preamble sequences (i.e., symbols) from different carriers together at baseband.

A preamble-detection procedure, according to an embodiment, that is performed by preamble detector 111 is described below. In this embodiment, the procedure is a recursive binary search.

(1) Initialize a set C of candidates to consist of all possible preamble/delay tuples.

(2) Split the set of cells (denoted "A") into subsets B (typically two subsets) exhausting A. The first time this step is executed, let B=A.

(3) For each subset B add all the PRACH samples $S_{ik}$ (complex values) from each cell $C_i$ in the subset B together into a variable $S_k=\Sigma_i S_{ik}$. That is, in one embodiment, the following is performed:

```
for (k=1; k<=M; k++){
```

$$S_k = \sum_{i=1}^{N} S_{ik};$$

```
}
```

denote $S = [S_k] = S_1, S_2, \ldots, S_M$ (4) Correlate S (i.e., the aggregated PRACH samples $S_k$) with candidates in set C. If peaks appear for certain preamble/delay combinations larger than a threshold T then this is considered a potential candidate preamble/delay; if no peaks appear processing of next subset starts since there is no reason to look any further (see step 3).

(5) If this subset B only contains one cell, then the potential candidates determined in previous step are considered detected preambles/delays in this cell and processing of next subset starts (see step 3); otherwise, by means of recursion go to step [0026] with A taking the value of B and C is populated with the potential candidates determined in previous step only.

The procedure above provides all preambles transmitted with a certain energy or SNR as determined from the detection threshold. Moreover, the delay is determined forming the basis for timing alignment. The cell to which the preamble belongs is identified as well.

For step [0028] there are variations with regard to identifying candidates. For recursive steps investigating subsets B with more than one cell one may nominate the X strongest peaks as candidates (instead of doing a threshold comparison). It is only on the lowest level (where B contains one cell) that the threshold is needed (for protection against false alarm). The value X could vary depending on what recursive level the identifying occurs; a natural choice would be a high value for higher levels and a lower value for the lower levels. Another intermediate variation would be to have the value of the threshold increase from a low value to a high value for the last recursive step (on the lowest level).

An advantage of the above procedure is that it avoids correlating with all preambles/delays for all cells. This leads to a significant reduction in processing which leads to a significant increase in performance (e.g. more preambles can be served).

Because samples from several signals are added, also noise is added, whereas the signal energy from a preamble stems from a single cell. The SNR for a received preamble in a subset B with more than one cell is therefore lower than for the single cell where the preamble has been sent. This reduction in SNR may limit coverage of the cell, but for a dense network the reduction in SNR can be compensated by a higher PRACH target reception power PREAMBLE_RECEIVED_TARGET_POWER, 3GPP TS 38.213, clause 7.4.

Figure 3:
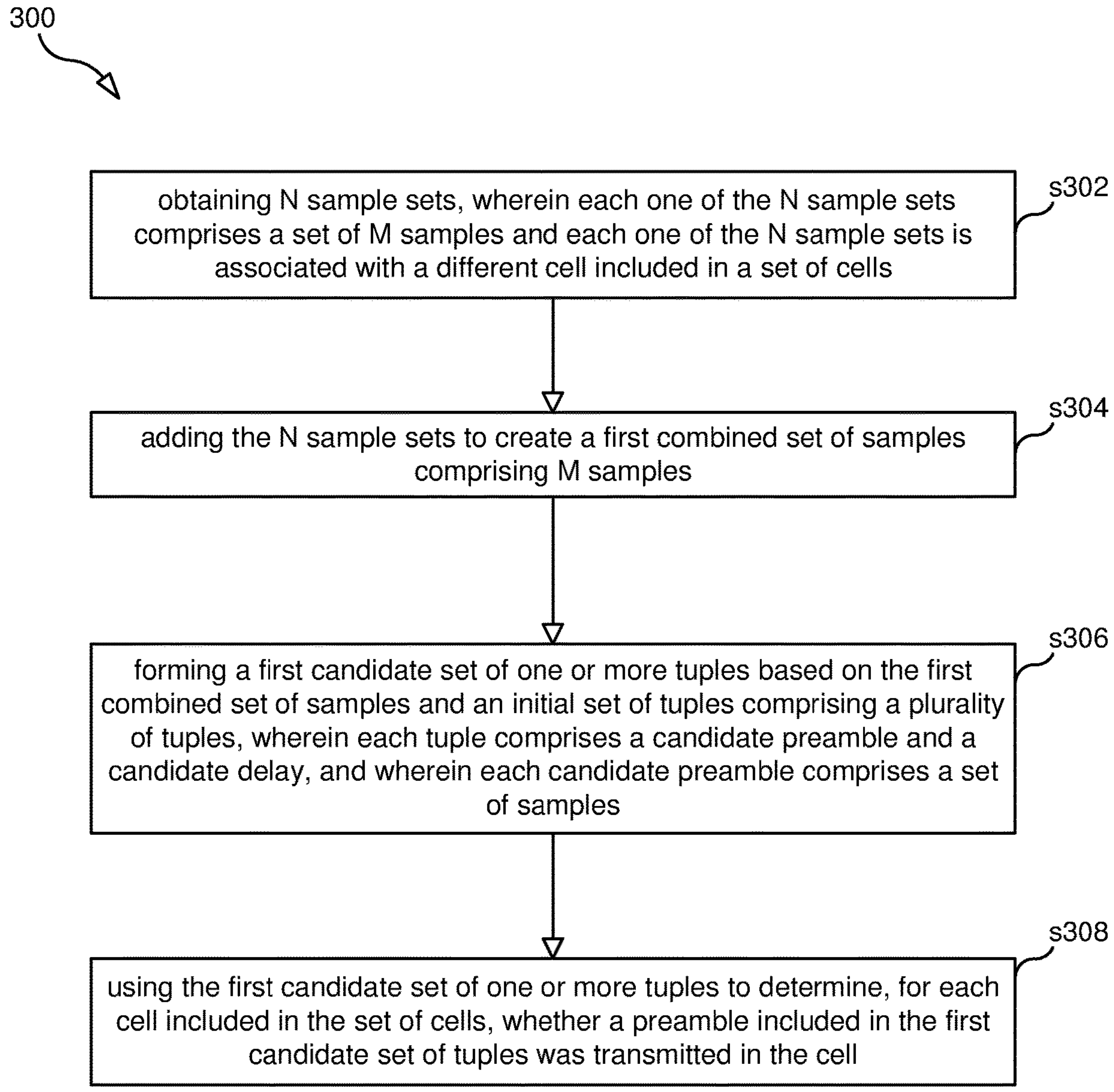
FIG. 3 is a message flow diagram according to an embodiment.

FIG. 3 is a flowchart illustrating a process 300, according to some embodiments, for determining cells in which a preamble has been transmitted. Process 300 may begin in step s302.

Step s302 comprises obtaining N sample sets, wherein each one of the N sample sets comprises a set of M samples and each one of the N sample sets is associated with a different cell included in a set of cells.

Step s304 comprises combining the N sample sets to create a first combined set of samples (S) comprising M samples (i.e., $S=[S_1, S_2, \ldots, S_M]$). Such combining could be, as described above, adding together each complex sample k (out of the M samples) from each of the N sample sets. For example, for the first complex sample (i.e., k=1) calculate $S_1=S_{11}+S_{21}+\ldots+S_{N1}$ (more generally, $S_k=S_{ik}\,S_{2k}+\ldots+S_{Nk}$ for k=1 to M). Another example is to include a cell-dependent factor $p_i$ with the effect that the combining is calculated as $S_k=p_1*S_{ik}+p_2*S_{2k}+\ldots+p_N*S_{Nk}$. The factor $p_i$ can be selected to be dependent on the totally received power in cell i; one example is that $p_i$ equals the inverse of the sum of the square of the absolute value of the samples $S_{ik}$ for k=1 to M.

Step s306 comprises forming a first candidate set of one or more tuples based on the first set of combined samples (S) and an initial set of tuples comprising a plurality of tuples, wherein each tuple comprises a candidate preamble and a candidate delay, and wherein each candidate preamble comprises a set of samples.

Step s308 comprises using the first candidate set of one or more tuples to determine, for each cell included in the set of cells, whether a preamble included in the first candidate set of tuples was transmitted in the cell.

In some embodiments, forming the first candidate set of one or more tuples comprises either (1) for each tuple included in the initial set of tuples, removing the tuple from the initial set of tuples as a result of determining that the tuple does not match the first combined set of samples, thereby forming the first candidate set of one or more tuples or (2) for each tuple included in the initial set of tuples, adding the tuple to the first candidate set of tuples as a result of determining that the tuple matches the first combined set of samples, thereby forming the first candidate set of one or more tuples.

In some embodiments, using the first candidate set of one or more tuples to determine, for each cell included in the set of cells, whether a preamble included in the first candidate set of tuples was transmitted in the cell comprises: (1) forming a first subset of the N sample sets; (2) combining the first subset of the N sample sets to create a second combined set of samples comprising M samples; (3) forming a second candidate set of tuples based on the second combined set of samples and the first candidate set of tuples; and (4) using the second candidate set of tuples to determine, for each cell associated with one of the sample sets included in the first subset of sample sets, whether a preamble included in the second candidate set of tuples was transmitted in the cell.

In some embodiments, forming the second candidate set of one or more tuples comprises either (1) for each tuple included in the first candidate set of tuples, removing the tuple from the first candidate set of tuples as a result of determining that the tuple does not match the second combined set of samples, thereby forming the second candidate set of one or more tuples or (2) for each tuple included in the first candidate set of tuples, adding the tuple to the second candidate set of tuples as a result of determining that the tuple matches the second combined set of samples, thereby forming the second candidate set of one or more tuples.

In some embodiments, using the first candidate set of one or more tuples to determine, for each cell included in the set of cells, whether a preamble included in the first candidate set of tuples was transmitted in the cell further comprises: forming a second subset of the N sample sets; combining the second subset of the N sample sets to create a third combined set of samples comprising M samples; forming a third candidate set of tuples based on the third combined set of samples and the first candidate set of tuples; and using the third candidate set of tuples to determine, for each cell associated with one of the sample sets included in the second subset of sample sets, whether a preamble included in the third candidate set of tuples was transmitted in the cell.

In some embodiments, forming the third candidate set of one or more tuples comprises either: (1) for each tuple included in the first candidate set of tuples, removing the tuple from the first candidate set of tuples as a result of determining that the tuple does not match the third combined set of samples, thereby forming the third candidate set of one or more tuples, or (2) for each tuple included in the first candidate set of tuples, adding the tuple to the third candidate set of tuples as a result of determining that the tuple matches the third combined set of samples, thereby forming the third candidate set of one or more tuples.

In some embodiments, the second subset of the N sample sets is disjoint with the first subset of the N sample sets.

In some embodiments, using the first candidate set of one or more tuples to determine, for each cell included in the set of cells, whether a preamble included in the first candidate set of tuples was transmitted in the cell comprises: for each cell included in the set of cells, determining whether the sample set corresponding to the cell matches one or more of the tuples included in the first candidate set of tuples.

In some embodiments combining the N sample sets to create a first combined set of samples comprising M samples comprises calculating: $S_{11}+S_{21}+\ldots+S_{N1}$, where $S_{11}$ is a first sample within a first one of the N sample sets, $S_{21}$ is a first sample within a second one of the N sample set, and $S_{N1}$ is a first sample within the Nth one of the N sample sets.

In some embodiments combining the N sample sets to create a first combined set of samples comprising M samples comprises calculating: $(\mathbf{p1}*S_{11})+(\mathbf{p2}*S_{21})++(pN*S_{N1})$, where $S_{11}$ is a first sample within a first one of the N sample sets, $S_{21}$ is a first sample within a second one of the N sample set, $S_{N1}$ is a first sample within the Nth one of the N sample sets, pi for i=1 to N is a determined factor for the i-th cell.

Figure 4:
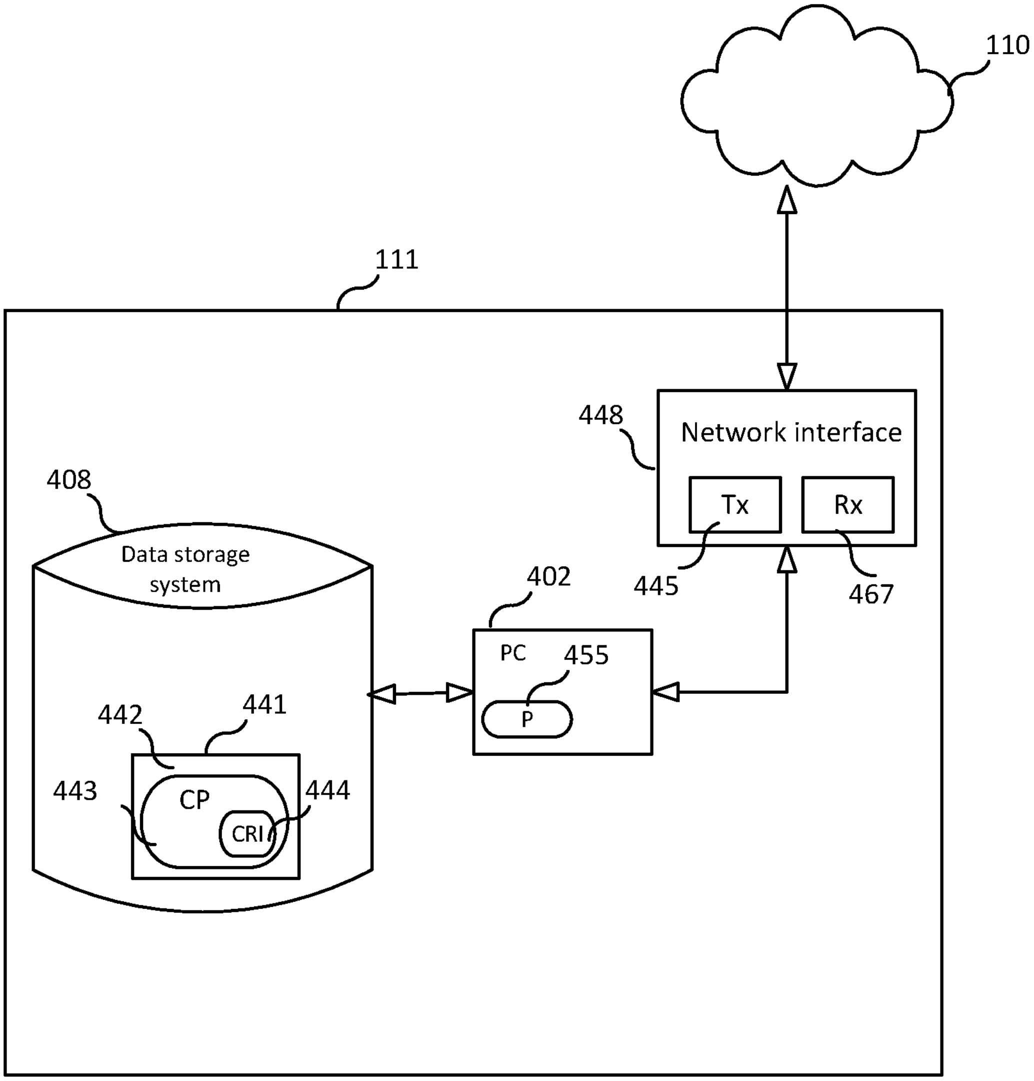
FIG. 4 is a block diagram of a preamble detector according to an embodiment.

FIG. 4 is a block diagram of preamble detector 111 according to some embodiments. As shown in FIG. 4, preamble detector 111 may comprise: processing circuitry (PC) 402, which may include one or more processors (P) 455 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., preamble detector 111 may be a distributed computing apparatus); at least one network interface 448 (e.g., a physical interface or air interface) comprising a transmitter (Tx) 445 and a receiver (Rx) 447 for enabling preamble detector 111 to transmit data to and receive data from other nodes connected to a network 110 (e.g., an Internet Protocol (IP) network) to which network interface 448 is connected (physically or wirelessly) (e.g., network interface 448 may be coupled to an antenna arrangement comprising one or more antennas for enabling preamble detector 111 to wirelessly transmit/receive data); and a local storage unit (a.k.a., "data storage system") 408, which may include one or more non-volatile storage devices and/or one or more volatile storage devices. In embodiments where PC 402 includes a programmable processor, a computer program product (CPP) 441 may be provided. CPP 441 includes a computer readable medium (CRM) 442 storing a computer program (CP) 443 comprising computer readable instructions (CRI) 444. CRM 442 may be a non-transitory computer readable medium, such as, magnetic media (e.g., a hard disk), optical media, memory devices (e.g., random access memory, flash memory), and the like. In some embodiments, the CRI 444 of computer program 443 is configured such that when executed by PC 402, the CRI causes preamble detector 111 to perform steps described herein (e.g., steps described herein with reference to the flow charts). In other embodiments, preamble detector 111 may be configured to perform steps described herein without the need for code. That is, for example, PC 402 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for determining cells in which a preamble has been transmitted, the method comprising:

obtaining N sample sets, wherein each one of the N sample sets comprises a set of M samples and each one of the N sample sets is associated with a different cell included in a set of N cells, and further wherein N is an integer greater than zero and M is an integer greater than zero;

combining the N sample sets to create a first combined set of samples comprising M samples;

forming a first candidate set of one or more tuples based on the first combined set of samples and an initial set of tuples comprising a plurality of tuples, wherein each tuple comprises a candidate preamble and a candidate delay, and wherein each candidate preamble comprises a set of symbols; and using the first candidate set of one or more tuples to determine, for each cell included in the set of cells, whether a preamble included in the first candidate set of tuples was transmitted in the cell.

2. The method of claim 1, wherein forming the first candidate set of one or more tuples comprises:

for each tuple included in the initial set of tuples, removing the tuple from the initial set of tuples as a result of determining that the tuple does not match the first combined set of samples, thereby forming the first candidate set of one or more tuples, or for each tuple included in the initial set of tuples, adding the tuple to the first candidate set of tuples as a result of determining that the tuple matches the first combined set of samples, thereby forming the first candidate set of one or more tuples.

3. The method of claim 1, wherein using the first candidate set of one or more tuples to determine, for each cell included in the set of cells, whether a preamble included in the first candidate set of tuples was transmitted in the cell comprises:

forming a first subset of the N sample sets;

combining the first subset of the N sample sets to create a second combined set of samples comprising M samples;

forming a second candidate set of tuples based on the second combined set of samples and the first candidate set of tuples; and using the second candidate set of tuples to determine, for each cell associated with one of the sample sets included in the first subset of sample sets, whether a preamble included in the second candidate set of tuples was transmitted in the cell.

4. The method of claim 3, wherein forming the second candidate set of one or more tuples comprises:

for each tuple included in the first candidate set of tuples, removing the tuple from the first candidate set of tuples as a result of determining that the tuple does not match the second combined set of samples, thereby forming the second candidate set of one or more tuples, or for each tuple included in the first candidate set of tuples, adding the tuple to the second candidate set of tuples as a result of determining that the tuple matches the second combined set of samples, thereby forming the second candidate set of one or more tuples.

5. The method of claim 3, wherein using the first candidate set of one or more tuples to determine, for each cell included in the set of cells, whether a preamble included in the first candidate set of tuples was transmitted in the cell further comprises:

forming a second subset of the N sample sets;

combining the second subset of the N sample sets to create a third combined set of samples comprising M samples;

forming a third candidate set of tuples based on the third combined set of samples and the first candidate set of tuples; and using the third candidate set of tuples to determine, for each cell associated with one of the sample sets included in the second subset of sample sets, whether a preamble included in the third candidate set of tuples was transmitted in the cell.

6. The method of claim 5, wherein forming the third candidate set of one or more tuples comprises:

for each tuple included in the first candidate set of tuples, removing the tuple from the first candidate set of tuples as a result of determining that the tuple does not match the third combined set of samples, thereby forming the third candidate set of one or more tuples, or for each tuple included in the first candidate set of tuples, adding the tuple to the third candidate set of tuples as a result of determining that the tuple matches the third combined set of samples, thereby forming the third candidate set of one or more tuples.

7. The method of claim 5, wherein the second subset of the N sample sets is disjoint with the first subset of the N sample sets.

8. The method of claim 1, wherein using the first candidate set of one or more tuples to determine, for each cell included in the set of cells, whether a preamble included in the first candidate set of tuples was transmitted in the cell comprises:

for each cell included in the set of cells, determining whether the sample set corresponding to the cell matches one or more of the tuples included in the first candidate set of tuples.

9. The method of claim 1, wherein combining the N sample sets to create a first combined set of samples comprising M samples comprises calculating: S11+S21+ . . . +SN1, where S11 is a first sample within a first one of the N sample sets, S21 is a first sample within a second one of the N sample set, and SN1 is a first sample within the Nth one of the N sample sets.

10. The method of claim 1, wherein combining the N sample sets to create a first combined set of samples comprising M samples comprises calculating: (p1*S11)+(p2*S21)+ . . . +(pN*SN1), where S11 is a first sample within a first one of the N sample sets, S21 is a first sample within a second one of the N sample set, SN1 is a first sample within the Nth one of the N sample sets, pi for i=1 to N is a determined factor for the i-th cell.

11. A non-transitory computer readable storage medium storing a computer program comprising instructions which when executed by processing circuitry of a preamble detector, causes the preamble detector to perform the method of claim 1.

12. A preamble detector, the preamble detector comprising:

processing circuitry; and a memory, the memory containing instructions executable by the processing circuitry, whereby the preamble detector is configured to perform a method comprising:

obtaining N sample sets, wherein each one of the N sample sets comprises a set of M samples and each one of the N sample sets is associated with a different cell included in a set of N cells, and further wherein N is an integer greater than zero and M is an integer greater than zero;

adding the N sample sets to create a first combined set of samples comprising M samples;

forming a first candidate set of one or more tuples based on the first combined set of samples and an initial set of tuples comprising a plurality of tuples, wherein each tuple comprises a candidate preamble and a candidate delay, and wherein each candidate preamble comprises a set of samples; and using the first candidate set of one or more tuples to determine, for each cell included in the set of cells, whether a preamble included in the first candidate set of tuples was transmitted in the cell.

13. The preamble detector of claim 12, wherein forming the first candidate set of one or more tuples comprises:

for each tuple included in the initial set of tuples, removing the tuple from the initial set of tuples as a result of determining that the tuple does not match the first combined set of samples, thereby forming the first candidate set of one or more tuples, or for each tuple included in the initial set of tuples, adding the tuple to the first candidate set of tuples as a result of determining that the tuple matches the first combined set of samples, thereby forming the first candidate set of one or more tuples.

14. The preamble detector of claim 12, wherein using the first candidate set of one or more tuples to determine, for each cell included in the set of cells, whether a preamble included in the first candidate set of tuples was transmitted in the cell comprises:

forming a first subset of the N sample sets;

combining the first subset of the N sample sets to create a second combined set of samples comprising M samples;

forming a second candidate set of tuples based on the second combined set of samples and the first candidate set of tuples; and using the second candidate set of tuples to determine, for each cell associated with one of the sample sets included in the first subset of sample sets, whether a preamble included in the second candidate set of tuples was transmitted in the cell.

15. The preamble detector of claim 14, wherein forming the second candidate set of one or more tuples comprises:

for each tuple included in the first candidate set of tuples, removing the tuple from the first candidate set of tuples as a result of determining that the tuple does not match the second combined set of samples, thereby forming the second candidate set of one or more tuples, or for each tuple included in the first candidate set of tuples, adding the tuple to the second candidate set of tuples as a result of determining that the tuple matches the second combined set of samples, thereby forming the second candidate set of one or more tuples.

16. The preamble detector of claim 14, wherein using the first candidate set of one or more tuples to determine, for each cell included in the set of cells, whether a preamble included in the first candidate set of tuples was transmitted in the cell further comprises:

forming a second subset of the N sample sets;

combining the second subset of the N sample sets to create a third combined set of samples comprising M samples;

forming a third candidate set of tuples based on the third combined set of samples and the first candidate set of tuples; and using the third candidate set of tuples to determine, for each cell associated with one of the sample sets included in the second subset of sample sets, whether a preamble included in the third candidate set of tuples was transmitted in the cell.

17. The preamble detector of claim 16, wherein forming the third candidate set of one or more tuples comprises:

for each tuple included in the first candidate set of tuples, removing the tuple from the first candidate set of tuples as a result of determining that the tuple does not match the third combined set of samples, thereby forming the third candidate set of one or more tuples, or for each tuple included in the first candidate set of tuples, adding the tuple to the third candidate set of tuples as a result of determining that the tuple matches the third combined set of samples, thereby forming the third candidate set of one or more tuples.

18. The preamble detector of claim 16, wherein the second subset of the N sample sets is disjoint with the first subset of the N sample sets.

19. The preamble detector of claim 12, wherein using the first candidate set of one or more tuples to determine, for each cell included in the set of cells, whether a preamble included in the first candidate set of tuples was transmitted in the cell comprises:

for each cell included in the set of cells, determining whether the sample set corresponding to the cell matches one or more of the tuples included in the first candidate set of tuples.

20. The preamble detector of claim 12, wherein combining the N sample sets to create a first combined set of samples comprising M samples comprises calculating: S11+S21+ . . . +SN1, where S11 is a first sample within a first one of the N sample sets, S21 is a first sample within a second one of the N sample set, and SN1 is a first sample within the Nth one of the N sample sets.

* * * * *